Aug. 3, 1937.  T. H. SEELY  2,088,765
GOUGING MACHINE
Filed July 19, 1935  5 Sheets-Sheet 1
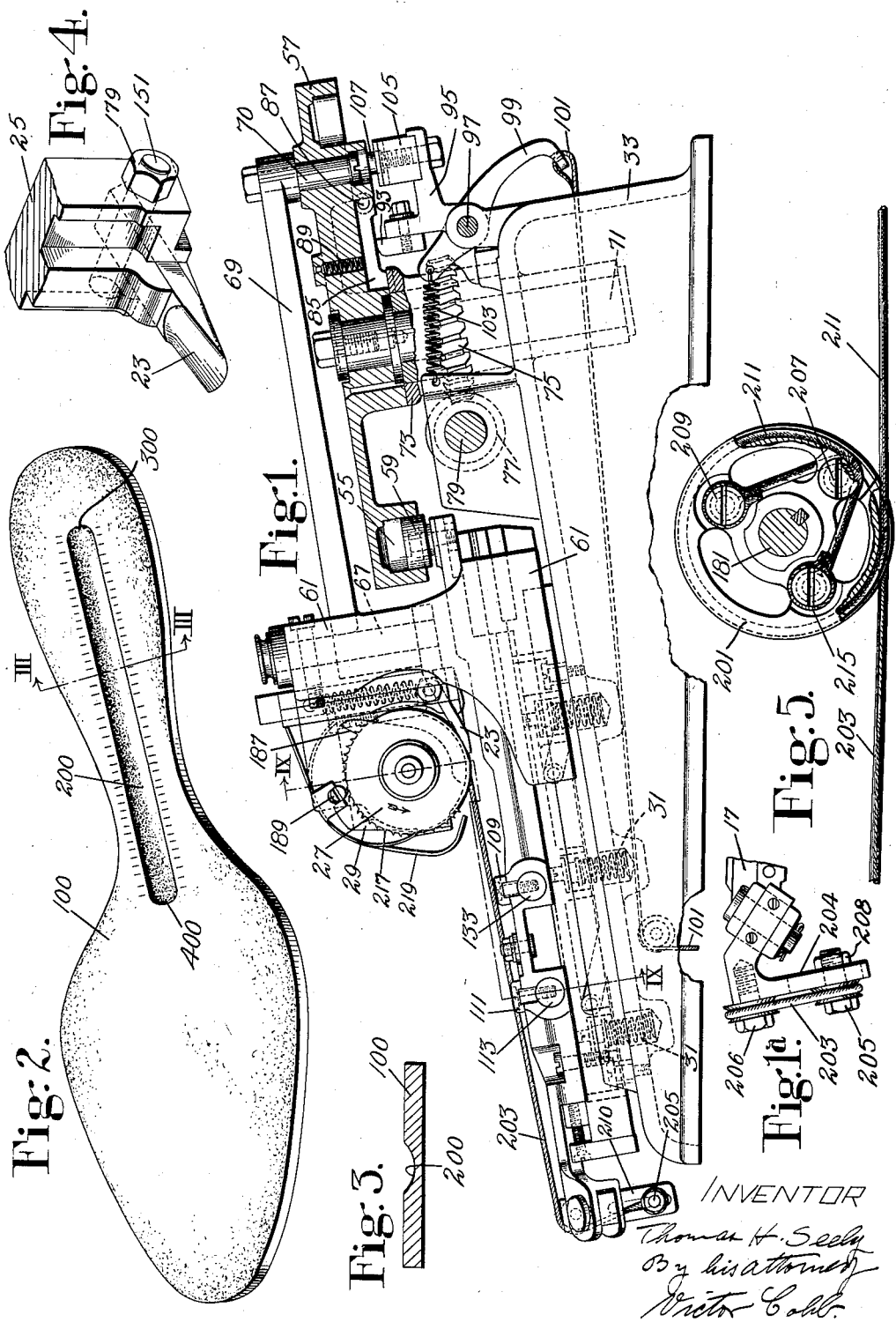

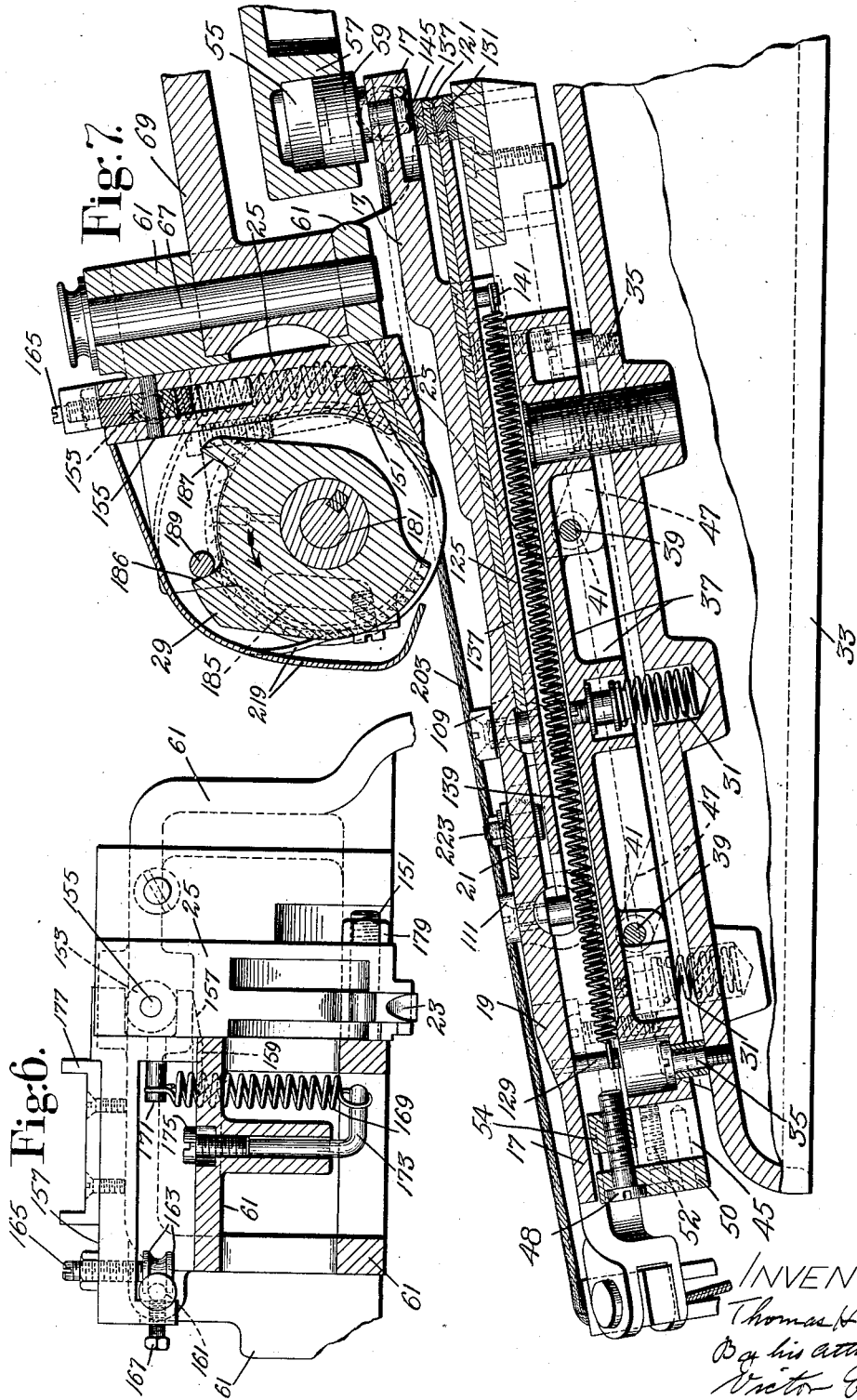

Aug. 3, 1937. T. H. SEELY 2,088,765
GOUGING MACHINE
Filed July 19, 1935 5 Sheets-Sheet 3
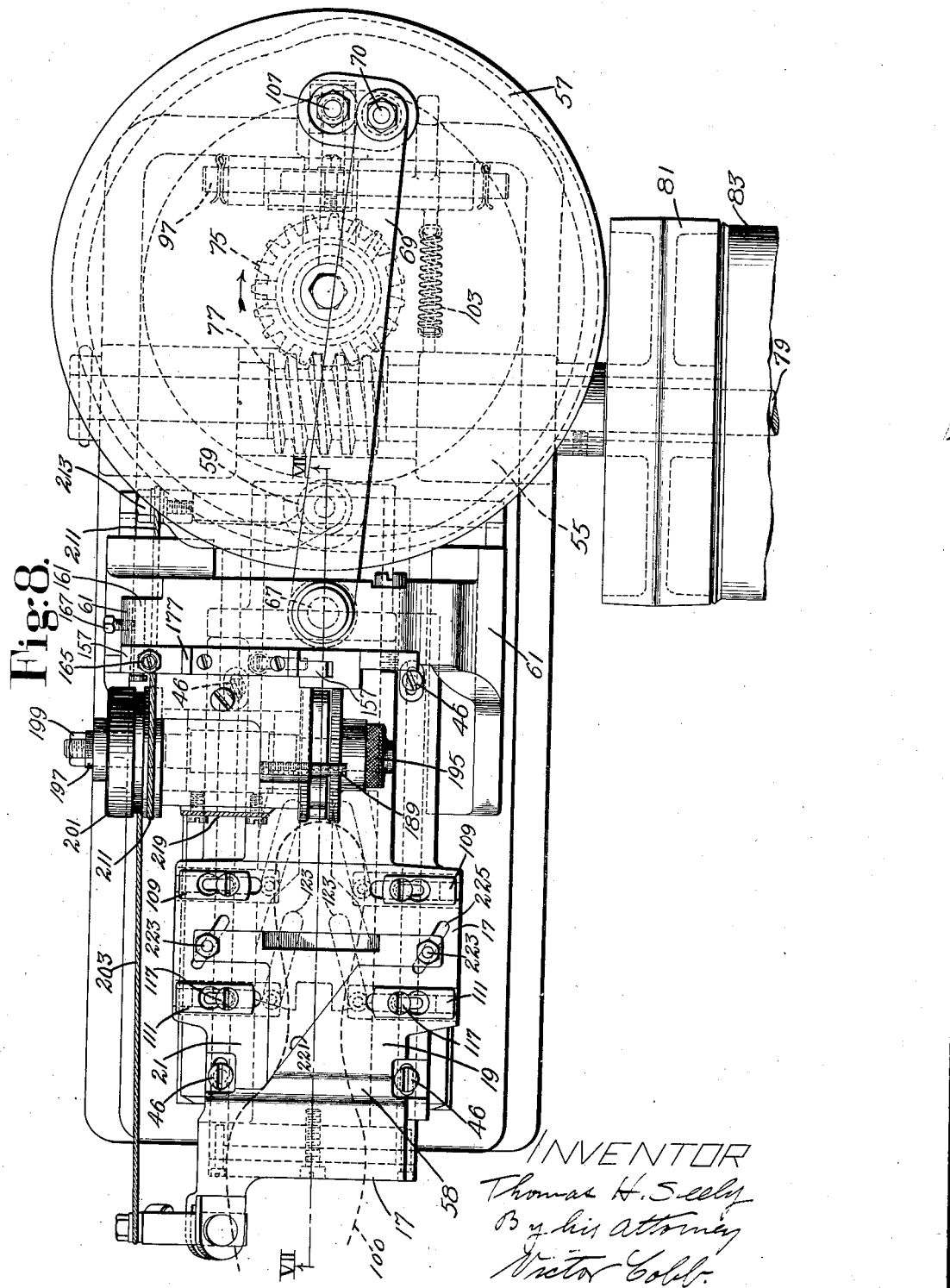

Aug. 3, 1937.　　　　T. H. SEELY　　　　2,088,765
GOUGING MACHINE
Filed July 19, 1935　　　5 Sheets-Sheet 4

INVENTOR
Thomas H. Seely
By his attorney
Victor Coleb

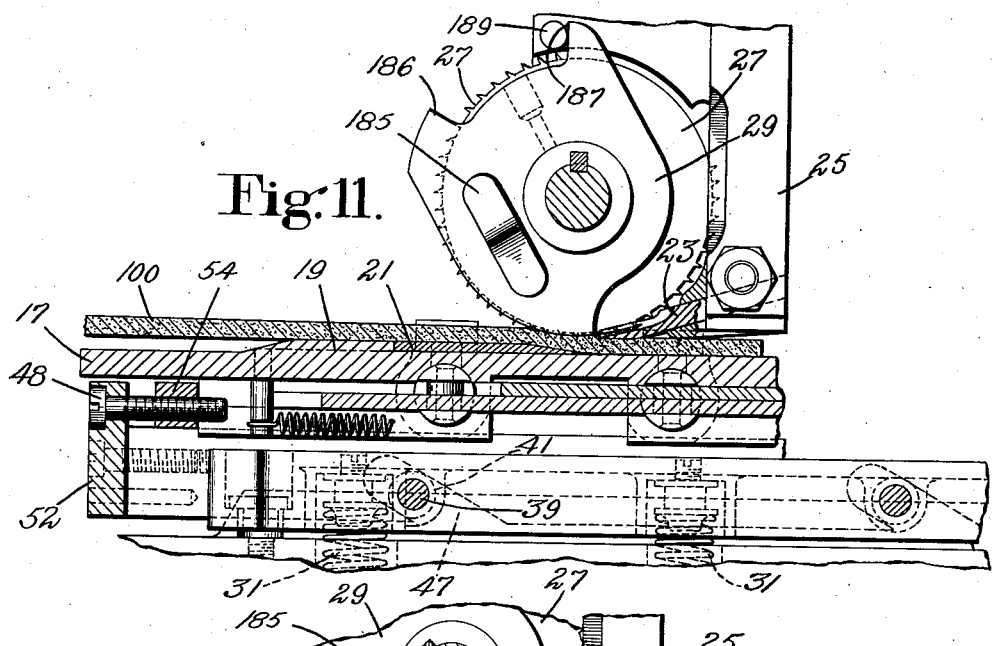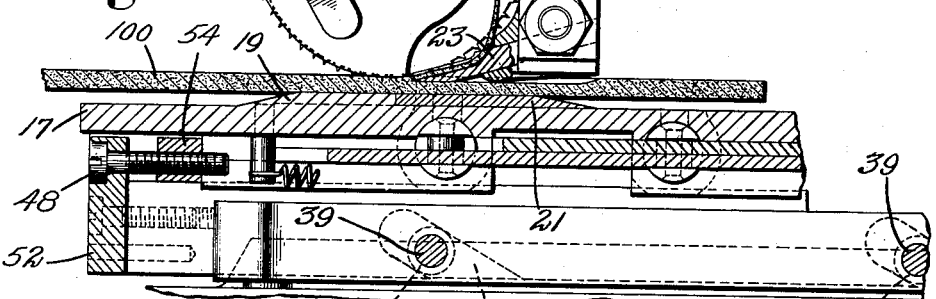

Patented Aug. 3, 1937

2,088,765

UNITED STATES PATENT OFFICE 2,088,765

GOUGING MACHINE

Thomas H. Seely, Melrose, Mass., assignor to United Shoe Machinery Corporation, Paterson, N. J., a corporation of New Jersey Application July 19, 1935, Serial No. 32,254

15 Claims. (Cl. 12—40)

This invention relates to cutting machines and is herein illustrated as embodied in a machine for cutting a groove in the shank portion of a sole to receive a metallic shank stiffener.

Hitherto such grooves have been formed by the use of various machines, for example that shown in United States Letters Patent No. 1,441,222, granted January 9, 1923 upon an application filed in the name of Frederick M. Furber, in which the sole is placed upon a work table over which reciprocates a cutter-head carrying a grooving cutter and a presser located in front of the cutter, the present machine being an improvement upon the machine of the patent.

The cutter which forms the groove in the work has a tendency to lift the work from the work table during the cutting of the groove; and, in order to hold the work firmly upon the table, means is provided in accordance with one feature of the invention, for progressively engaging the work alongside the groove as it is being formed to hold the work from movement with respect to the table. In the illustrated construction this means takes the form of two toothed presser rolls which engage the work on both sides of the groove, said rolls being rotated at such peripheral speed that there is no tendency to move the work along the table.

According to another feature of the invention the work is located properly on the table by gages which are moved apart to permit the work to be placed between them and are automatically closed upon the edges of the work before the cutting begins. In the illustrated construction the gages are normally held apart by the cutter-head when the machine is at rest and are released by the first part of the forward movement of the cutter-head so as to close upon opposite edges of the work.

In machines of the general type of the present one in which the work table is in lowered initial position when the machine is at rest and is raised a predetermined distance to bring the work into the path of the cutter, it is desirable to provide means for adjusting the table into different initial positions for pieces of work of different thicknesses so that, when the table is later raised to present the work to the cutter, it will be at the proper level; and according to another feature of the invention such means is provided.

These and other features of the invention, including certain details of construction and combinations of parts, will be described as embodied in an illustrated machine and pointed out in the appended claims.

In the drawings,

Fig. 1 is a side elevation of a machine in which the present invention is embodied;

Fig. 1ᵃ is a detail in elevation showing how one end of one cable is fastened to a projection on the table;

Fig. 2 is a perspective view of a sole after it has been operated upon;

Fig. 3 is a cross section of the sole on the line III—III of Fig. 2;

Fig. 4 is a detail in perspective showing the mounting of the knife in its carrier;

Fig. 5 is a detail in elevation showing how the cables are attached to the drum;

Fig. 6 is an elevation of a part of the upper portion of the machine showing more particularly how the knife carrier is mounted in the reciprocating head;

Fig. 7 is a longitudinal medial section of the machine on the line VII—VII of Fig. 8;

Fig. 8 is a plan of the machine, a sole being shown in the position in which it is placed on the work-table;

Figs. 11, 12 and 13 are longitudinal sections through a portion of the machine showing different stages in the formation of the groove in the sole.

Figure 9:
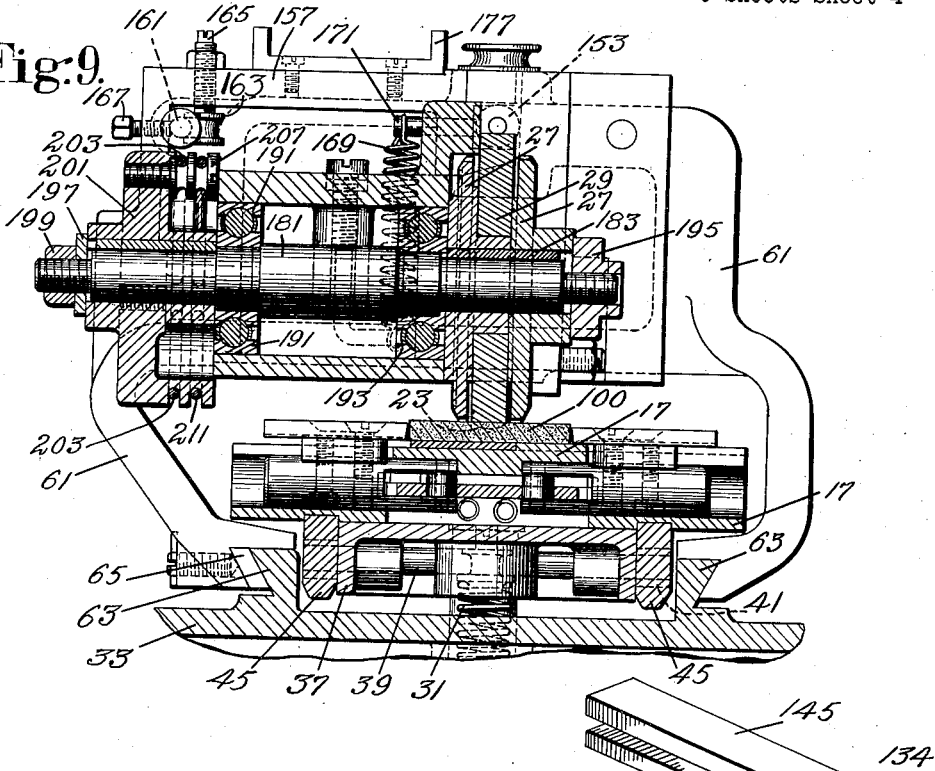
Fig. 9 is a vertical cross section of the machine in two planes indicated by the line IX—IX of Fig. 1.

Referring first to Figs. 2 and 3 the purpose of the machine, as has been stated above, is to form a longitudinal groove 200 in a sole 100 to receive a metallic shank stiffener. Before proceeding to describe the details of construction of the machine, its general construction and mode of operation will be described. The sole 100 is placed lengthwise on a table 17 (Figs. 11, 12 and 13) which has on its surface a flat-topped projection with beveled ends made up of a part 19 which is integral with the table and a part 21 which is in the form of an adjustable plate so that the length of the projection may be varied. The purpose of this flat-topped projection with beveled ends is to cause the sole to be bent first in the locality where the knife enters the sole and later at the locality where the knife leaves it so as to facilitate the entrance of the knife into the sole and its emergence from the sole. A grooving cutter 23 is carried by a cutter-holder 25 mounted in a cutter-head which moves lengthwise of the sole to make the groove and then returns to initial position where it comes to rest. The head carries two toothed-presser rolls, one of which is indicated in Figs. 11 to 13 at 27, and between them a presser foot 29, the presser foot being cut away as shown to form an abrupt shoulder so as to allow it to engage the sole just in front of the cutter or knife. The table is raised and lowered at proper times but is at all times supported yieldingly by springs so that it may be pushed down at any time by pressure upon the sole. In the operation of the machine a sole 100 is placed in proper endwise position on the table and is located in proper widthwise position by gage mechanism which will be described later. A clutch is tripped to cause the head, which carries the knife, rolls and presser-foot, to make one reciprocation and come to rest, and to cause the table to be raised and lowered at the proper times. Shortly after the head begins its forward movement (to the left in Figs. 11 to 13) the table 17 is raised whereupon the presser foot 29 bends a rear portion of the sole over one beveled end of the projection formed on the upper surface of the table so as to cause the knife to enter the surface of the sole on an angle, as shown in Fig. 11. As the head continues its forward movement the presser foot 29 and rolls 27, by pushing on the sole, lower the yieldingly supported table somewhat and hold it at lowered position while they are holding a portion of the sole against the flat upper surface of the projection as shown in Fig. 12, the cut being then parallel to the plane of the sole and of a uniform depth depending upon the vertical position of the knife edge with respect to the lowermost elements of the presser foot and presser rolls. Near the end of the forward stroke of the head, as the presser foot and rolls engage that portion of the sole which lies above the bevel at the other end of the projection on the table, the table is pushed up by its springs, and the sole is bent again, as shown in Fig. 13, to cause the knife to emerge from the sole. The table is then lowered and the head returns to initial position and comes to rest as shown in Figs. 1, 7 and 8 ready to receive another sole.

The construction by which the work-supporting table 17 is mounted for up-and-down movement, the construction by which the head is slidably mounted on the base, and the means for raising and lowering the table and for reciprocating the head are the same or similar to the corresponding constructions of the machine of the United States Letters Patent which has been referred to above; and, before proceeding to a detailed description of what is new, a brief description of what is old will be given. Referring to Figs. 7 and 9, resting upon springs 31, the lower ends of which are received in sockets in a base or frame 33, and limited in its upward movement with respect to the base by headed screws 35, is a table-support 37 having downwardly extending flanges along its sides (Fig. 9). Carried by this support are two cross rods 39 having at their opposite ends rolls 41 which project beyond the flanges. The work-table 17, which is longitudinally slidable on the support 37, has fastened to it and projecting downward from its underside two-spaced bars 45 which fit against the outer faces of the flanges of the support 37. In the patented machine the bars 45 are integral with the table but in the present construction they are adjustably fastened to it for a purpose which will be described later. The four rolls 41 are received respectively in four inclined slots or guideways 47 formed in the bars 45. When the machine is at rest the table occupies its extreme rearward position, as shown in Fig. 7, being held in that position, as will appear later, by the mechanism for imparting to it a short reciprocation. When the table 17 is moved forward (to the left as viewed in Fig. 7) it will be raised with respect to the support 37 by reason of the engagement of the inclined slots 47, which are formed in the spaced bars 45, with the rolls 41 which are carried by the support 37. It will be noted, however, that to whatever position the table may be raised above the table support, the table and its support may be pushed down together against the force of the springs 31. The table 17 is reciprocated through a short path first to move it into and hold it in its raised position (Fig. 11) and then to return it to its normal position of rest (Fig. 7) by a rotary member 57 having formed in its under side a suitably shaped cam track 55 into which extends a roll 59 carried by the table 17. This mechanism for reciprocating the table 17 differs from the corresponding mechanism of the patented machine in that the table is reciprocated positively in both directions, the rotary member 57 being of a somewhat different construction from that of the corresponding member of the patented machine. The head 61 (Fig. 9) which carries the knife 23, the toothed-presser rolls 27 and the presser foot 29, is slidably mounted on undercut guideways 63 formed on the base of the machine, there being a gib 65 adjustably carried by the head and held against one of the guides 63 to take up wear. Pivoted to the head 61 (Fig. 1) by a heavy pin 67 is one end of a connecting rod the other end of which is pivoted at 70 to the rotary member 57.

Mechanism is provided for imparting one revolution to this member 57 and then causing it to come to rest in the position shown. To this end the member 57 has a downwardly extending spindle 71 rotatable in a bearing in the base 33. About the upper portion of this bearing is rotatably mounted a sleeve 73 carrying a gear 75 which meshes with a worm 77 on a shaft 79 having the usual fast and loose pulleys 81, 83 (Fig. 8). Returning to Fig. 1, the upper surface of the sleeve 73 is provided with a series of radial grooves or notches any one of which may be engaged by a latch 85 pivoted at 87 to the member 57. A compression spring 89 urges the latch to swing downwardly into engagement with one of the notches formed in the upper surface of the sleeve 73. The latch is held up out of engagement with the notches when the machine is at rest, as shown, by a lifter 93 carried by the upright arm on a two-armed lever 95 the hub of which is rotatably mounted on a horizontal spindle 97 carried by the base 33. Integral with the hub of the lever 95 is a second lever 99 the lower end of which is attached by a cord 101 to a treadle, not shown, the upper end of the lever 99 being attached by a tension spring 103 to the base 33. When now the treadle is depressed to rock the levers 95, 99 in a clockwise direction, the latch 85 is freed and engages a notch in the upper surface of the constantly rotating sleeve 73, and movement is imparted from this rotating sleeve through the latch 85 to the member 57. The rotation of the member 57 is comparatively slow, and the treadle is released before one rotation has been completed so that, at the end of one rotation, the latch 85 rides up on the lifter 93, which has returned to the position shown, and is disengaged from the sleeve 73. In order to stop the movement of the member 57 at the end of one rotation, the lever 95 has a second arm carrying a block 105 provided with a slot into which a pin 107, which is fastened to the member 55, is caused to extend. The block has a beveled face forward of the slot, considered in the direction of rotation of the member 57, up which the pin rides, thus depressing the block slightly against the force of the spring 103 until the pin reaches the slot whereupon the spring 103 causes the block to move up and engage the pin as shown in Fig. 1. The machine thus far described, except as has been noted, is or may be substantially the same as the patented machine and will not be described further in detail. It will be understood, however, that when the treadle is depressed the table 17 is raised somewhat with respect to the table-support 37, held raised for a period and then lowered, and that the head 61, with its knife 23, presser rolls 27 and presser foot 29, makes one complete reciprocation.

It has been explained above that the bars 45 (Fig. 9) which contain the inclined slots 47 (Fig. 7) are adjustable with respect to the table 17 to which they are fast, and that the table has at its rear end a roll 59 which runs in a cam track 55 in the rotary member 57. One purpose of this construction, which differs from that of the patented machine, is to permit the table 17 to be adjusted to different vertical positions with respect to its support 37. The bars 45 are adjustably fastened in grooves in the under side of the table 17 by four screws 46 (Fig. 8) which pass through slots in the table and are threaded into the tops of the bars; and, after these screws have been loosened, the bars may be adjusted along the grooves formed in the under side of the table. The table is held at this time from longitudinal movement by the engagement of the roll 59 with the track 55, and consequently the longitudinal adjustment of the bars 45 causes them, and with them the table 17, to be raised or lowered according to whether the direction in which they are adjusted causes the inclined slots 47 (Fig. 7) in them to ride up or to ride down on the rolls 41 carried by the support 37. As shown in Fig. 7, the table 17 occupies its lowest position with respect to the support 37, the rolls 41 occupying the extreme upper ends of the inclined slots 47 in the bars 45. In order to effect the adjustment of the bars 45 after the screws 46, which fasten them to the table 17, have been loosened, an adjusting screw 48 passes through a cross-piece 50 which is fastened by screws, one of which is shown at 52, to the left-hand ends of the bars 45 and is threaded through a block 54 which is fastened to the table 17. With the parts in the position shown and assuming that the screws 46 (Fig. 8) which fasten the bars 45 to the under side of the table 17 have been loosened, the adjusting screw 48 is threaded farther through the block 54, the bars will be pulled to the left whereby the slots 47 will ride up on the rolls 41, and the bars, beside moving to the left, will also rise. The table 17, which is supported on the bars 45, does not move longitudinally, since it is held from such movement by the engagement of the roll 59 with the track 55; but it rises with the bars, the roll 59 rising farther into the track 55. Thus, by turning the adjusting screw 48, the table 17 may be adjusted into different desired initial vertical positions to provide for soles of different thicknesses; and, after it has been so adjusted, the screws 46 (Fig. 8) which fasten the bars 45 to the under side of the table may be tightened. Thereafter the bars 45 and the table 17 are rigidly fastened together and have no movement independent of each other.

The soles are placed on the table with their heel ends toward the knife, the groove 200 (Fig. 2), which is always of the same length irrespective of the length of the sole, being cut from the heel portion toward the toe portion of the sole, starting at a point 300 and ending at a point 400. The location of the heel end of the groove is not important, but the forward end of the groove should be located in a position at or near the junction of the shank with the forepart. To this end the sole is placed on the table 17 substantially as indicated in Fig. 8 with the locality at the junction of the shank with the forepart above the beveled portion 58 at the outer end of the projection on the table 17. This locates the sole lengthwise. In order to locate it sidewise, two pairs of gages are provided, a pair 109 which engage the sole on opposite edges at about the heel-breast line and a second pair 111 which engage opposite edges of the sole in the shank portion. The members of these two pairs of gages, which for convenience will be called respectively heel-breast line gages and shank gages, are normally held apart as shown in Fig. 8 and are closed upon the sole when the table is moved forward to raise it. Since both pairs of gages are similar in construction and mode of operation only one pair and its operating mechanism will be described in detail.

Figure 10:
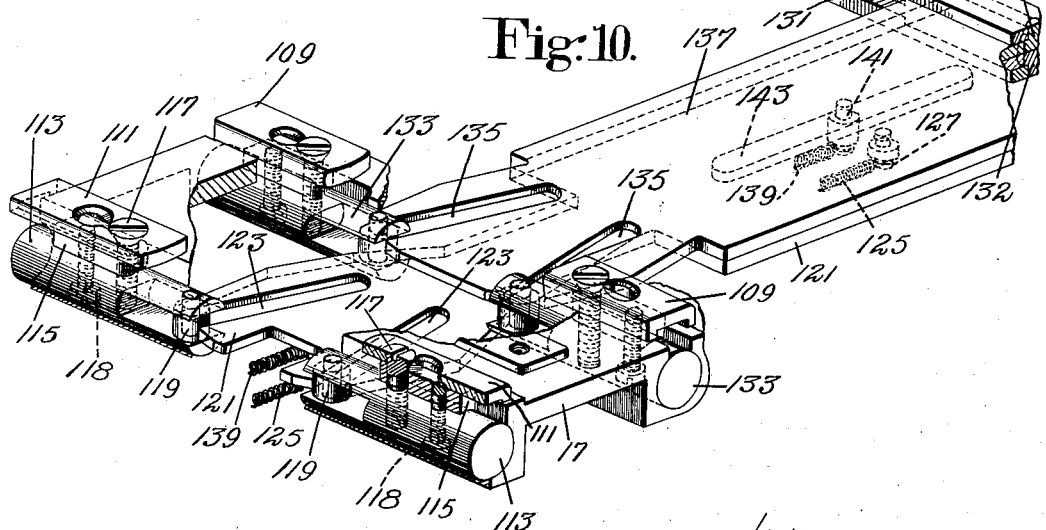
Fig. 10 is a detail in perspective of the sole-locating gages and the mechanism for operating them.

Referring to Figs. 9 and 10, the shank gages 111 have grooves in their under sides to receive the upper portions of keys 115 the lower portions of which are received in key-ways in plungers 113, said keys being fastened to the plungers by screws 118, and being slidable in suitable ways formed in the table 17. The plungers and their keys are thus free to slide crosswise of the table but are held from rotation about the axes of the plungers. The gages 111 are fastened to the tops of the keys 115 and to the plungers 113 by screws 117, there being two holes for the heads of the screws in each gage 111, so that the gages may be held in either one of two positions with respect to the plunger. The inner ends of the plungers 113 are slotted and in these slots are rolls 119 rotatably mounted about substantially vertical axes. A reciprocating plate 121 has in one end slots 123 which receive respectively the rolls 119, said slots converging toward the other end of the plate. This plate is urged at all times to move forward so as to cause the gages to approach each other by a long spring 125, the rear end of which is fastened to a pin 127 on the under side of the plate and the forward end of which is fastened to a pin carried by the table. The pin to which the forward end of the spring 125 is fastened is not shown but is exactly like the pin 129 (Fig. 7) to which the forward end of the spring 139 (later to be described) is fastened. The rear end of the plate 121 is pivoted to a cross-bar 131 about the round head of a rivet 132 carried by the cross-bar, said cross-bar being engaged at two localities near the ends thereof by lower portions of the reciprocating cutter-head 61 (Fig. 7) on the rearward movement of said head so that, when the head comes to rest, the plate 121 occupies its extreme rear position, and the shank gages 111 are widely separated, as shown in Figs. 8 and 10. When a sole 100 (Fig. 8) is placed in proper lengthwise position on the table 17 and the treadle is depressed, the head moves forward thereby at once releasing the plate 121 (Fig. 10) to permit the spring 125 to move the plate forward with respect to the table and to cause the gages 111 to close against opposite edges of the shank portion of the sole.

The heel-breast line gages 109, as stated, are constructed and operated substantially as are the shank gages 111. They will, therefore, be only briefly described. These gages are adjustably fastened to plungers 133 having rolls mounted in their adjacent slotted ends which are received in converging slots 135 in a slide plate 137 which rests upon the other slide plate 121. The tension spring 139, which was referred to above, is fastened at its forward end to the pin 129 (Fig. 7) and its rear end to a pin 141 (Fig. 10) carried by the slide plate, said pin extending down through a slot 143 in the lower plate 121. The upper slide plate 137 is pivoted about the round head of a rivet 134 carried by a crossbar 145 which, when the machine is at rest, is directly above the crossbar 131 to which the lower plate 121 is pivoted. The plate 137 rests upon the plate 121, and the side edges of the two plates are received in suitable guideways, not shown, formed in a part of the table 17. As the head 61 moves forward from its position of rest the springs 125, 139 pull the plates 121, 137 forward. The plate 137 continues its forward movement until the heel-breast line gages 109 have closed upon the sole, and the plate 121 continues its forward movement until the shank gages 111 have closed upon the sole. All this occurs before the table is raised into position to present the sole to the presser rolls 27, the presser foot 29 and the knife 23, so that the sole is properly located on the table 17 before the grooving operation begins.

Referring now more particularly to Figs. 4, 6 and 9, the mounting and the mode of operation of the knife, presser rolls and presser foot will be described. The knife 23 (Figs. 4 and 6) is clamped in adjusted lengthwise position in an inclined slot in the knife holder 25 by a draw bolt 151 having a cutaway portion through which part of the knife extends, said knife holder being vertically slidable in a vertical guideway formed at the head 61. In order to permit vertical adjustment of this knife holder, it carries in a transverse slot in its upper end a small roll 153 (Fig. 7) mounted on a substantially horizontal pivot 155; and the knife holder is raised and lowered by means of a yoke which engages this roller and raises and lowers it. The yoke 157 (Fig. 6) between the arms of which the roller 153 is received rests at its lower right-hand end upon a small flat surface 159 formed on the head 61 and may be tilted on this surface which serves as a fulcrum. The yoke 157 has a horizontal stem, the left-hand end of which has a downwardly extending tail. Assuming now that the yoke is held from any substantial bodily movement in the direction of its length (that is to the right or left) and that the left-hand end of its stem is raised or lowered, the yoke will be tilted on the surface 159, and the roll 153, and with it the knife holder, will be raised or lowered. In order to hold the yoke from any substantial movement to the right or left, as viewed in Fig. 6, and to provide means for tilting it a screw 165, threaded through the stem of the yoke, has a head at its lower end provided with flanges; and between this flanged head and the downwardly extending tail at the left-hand end of the stem of the yoke 157, there extends a small rod 161 which is rigid with the head 61, one end of said rod being securely fastened in a socket in the head 61 by a set screw 167. This rod, located as it is between the flanged head at the lower end of the screw 165 and the downwardly extending tail on the stem of the yoke, prevents any substantial bodily movement of the yoke to the right or the left. When now the screw 165 is turned, the flanges 163 by engagement with the rod 161 prevent the screw from moving vertically. Consequently, turning the screw in one direction or the other swings the stem of the yoke up or down. A coiled tension spring 169, attached at its upper end to a pin 171 carried by the yoke and at its lower end to the outer end of the horizontal arm of a bent rod 173, holds the yoke down against the surface 159. The upright stem of the rod 173 is received in a socket formed in a part of the head 61 and is acted upon by a screw 175 by turning which the tension of the spring 169 may be varied. With his construction, turning the screw 165 tilts the yoke on the fulcrum surface 159, and this tilting of the yoke raises or lowers the knifeholder 25. It has been explained above that the knife is adjustable lengthwise in its holder, being held in adjusted position by the drawbolt 151. In order to secure an accurate adjustment of the knife after the holder has been removed from the head 61 and the drawbolt 151 loosened, there is fastened on top of the stem of the yoke 157 a gage in the form of a small bar 177 having upturned ends spaced apart such a distance that, when the knife holder and the knife are placed on the horizontal portion of the bar with the rear of the holder in contact with one of the upturned ends and the edge of the knife in contact with the other, the knife will be in proper lengthwise position in the holder. The drawbolt 151 may then be tightened by screwing up the nut 179 and the knife holder replaced in the head 61.

Referring now more particularly to Fig. 9, the presser rolls 27 are attached to a rotary shaft 181 by a key 183, the inner presser roll 27 having a hub which extends through a bore in the presser foot 29 and abuts the inner face of the outer presser roll 27. The presser foot 29, which is located between the rolls 27, is rotatably mounted on the hub of the inner roll 27 and has fastened on each of its side faces a leaf spring 185 (Figs. 11–13), said leaf springs being engaged respectively by the adjacent side faces of the rolls 27 so that, when the rolls are rotated, the presser foot 29 is rotated frictionally with them unless prevented from doing so. Referring to Figs. 7 and 11 which show the presser foot in its inoperative and in its operative position respectively, it will be noted that the upper part of the presser foot is cut away to provide two shoulders 186, 187 adapted to be engaged alternately by a pin 189 carried by the head 61. In Fig. 7, in which the parts of the machine are at rest, the shoulder 186 is in engagement with the pin 189. As soon as the head 61 moves a short distance forward the presser foot is rotated into the position shown in Fig. 11 in which the shoulder 187 engages the pin 189. It remains in this position during the rest of the forward stroke of the head 61 and is returned to the position shown in Fig. 7 during the first part of the return stroke of the head. Returning now to Fig. 9, the shaft 181 is rotatably mounted in two ball bearings 191, 193 carried by the head 61, the presser rolls 27 and the ball bearings 193 being clamped between a nut 195 threaded on a portion of reduced diameter at the right-hand end of the shaft 181 and a shoulder on the shaft which engages the hub of the ball bearing 193. At its left-hand end the shaft carries a nut 199 and a washer 197 between which and another shoulder on the shaft 181 are clamped the other ball bearing 191 and the hub of a drum 201 by means of which the shaft 181 is rotated first in one direction and then in the other to impart rotation to the presser rolls 27.

In order to cause the shaft 181 to rotate in a counterclockwise direction as viewed in Fig. 1 when the head 61 makes its forward stroke and to rotate in the opposite direction when the head makes its rearward stroke, two cables are provided. One of these cables 203 (Figs. 1, 1ª and 5) is fastened to a bracket 204 carried at one end of the table 17. This cable passes around a groove in the head of a cap screw 206, and then down where its extremity is formed as an eye which encircles the grooved head of a bolt 205, the stem of which extends through a slot in a depending portion of the bracket and is held in adjusted position by a nut 208. The other end of the cable 203 extends along a groove in the drum, into a groove in the head of a screw 207 carried by the drum, and then into the interior of the drum where its extremity is formed as an eye and fastened to the drum by a screw 209. The other cable 211 is fastened at its outer end by a cap screw 213 (Fig. 8) to the table. Its inner portion extends around the drum in a groove in the periphery thereof in the opposite direction from that of the cable 203, over a second grooved portion of the screw 207 and then into the interior of the drum, its extremity being fastened to the drum by a screw 215. With this construction, when the head 61 makes a forward stroke, the pull of the cable 211 causes the drum 201, and with it the presser rolls 27, to rotate in a counterclockwise direction (Figs. 1 and 5), said cable being partly unwound from the drum while the other cable 203 is partly wound up on the drum. When the head makes its rearward stroke to return to initial position, the drum is rotated in a clockwise direction, the cable 203 being partly unwound from the drum and the cable 211 being partly wound up on the drum. Owing to the size of the presser rolls 27 they are not required to make a complete revolution in either direction; and consequently the rows of teeth 217 extend only part way around the peripheries of the presser rolls. The function of the presser rolls is to hold the sole immovable with respect to the table 17 during the grooving operation. To this end their size, their rate of rotation and the form and spacing of their teeth are such that they have no tendency to feed the sole along the table but engage the sole progressively and hold it firmly in place during the grooving operation. In Figure 2 the marks of the teeth of these presser rolls appear in two rows one on each side of the groove 200. In order to avoid danger to the operator, a sheet metal guard 219 (Figs. 1, 7 and 11) is attached to the head 61 by screws.

It has been explained that the projection with beveled ends on the upper surface of the table 17 (Fig. 7) is composed of a part 19 which is integral with the table and a plate 21 which is adjustable on the table so as to vary the length of the projection. Referring to Fig. 8 wherein these parts are shown in plan view, the adjacent edges of these two parts abut each other in a plane which is oblique to the longitudinal dimension of the table 17 and is indicated by the line 221. The plate 21 is adjustably fastened to the table by screw bolts 223 which pass through slots 225 formed in the plate 21, said slots extending in a direction parallel to the line 221. When, therefore, the plate 21 is adjusted into different positions, its obliquely extending rear edge slides upon and remains in contact with the obliquely extending front edge of the part 19 so that the upper surface of the projection remains unbroken.

The complete operation of the machine will now be described. With the machine at rest (Figs. 1, 7, and 8) a sole 100 (Fig. 8) is placed on the table 17, as shown, with the ball line approximately over the bevel 58 at one end of the projection formed on the table. At this time the table is in lowered position with respect to the table support 37, as best shown in Fig. 7. The treadle of the machine is now depressed and released to cause the rotary member 51 to make one revolution whereupon the following movements take place. The head 61 moves forward and, during the first part of this movement, frees the gage-adjusting plates 121, 137 (Fig. 10) which are pulled forward by their springs 125, 139 to cause the shank gages 111 and the heel-breast-line gages 109 to locate the sole widthwise. The table travels forward on its support a short distance during which the inclined slots 47 ride up on the rolls 41 and raise the table above its support to the position shown in Fig. 11. Because of this raising of the table the presser rolls 27, the presser foot 29, and the knife 23, which are being carried forward by the head 61, engage the sole which is bent over the right-hand beveled end of the projection formed by the plate 21 and the part 19, and the knife enters the sole at this bend (Fig. 11). While the rolls and presser foot ride up the bevel, so to speak, the table and its bed are pushed down against the force of the springs 31 and remain in lowered position while that part of the sole which rests upon the flat top of the projection is being grooved, it being noted that the depth of the groove depends upon the vertical position of the edge of the knife with respect to the sole-engaging face of the presser foot. As the rolls and presser foot ride down the bevel at the left-hand end of the projection (Fig. 13) the table and its support are forced up by the springs 31 and the sole is again bent, this time in a manner to cause the knife to emerge from the sole. The table is then moved rearward a short distance to cause the slots 47 to ride down on the rolls 41 and thereby to lower the table with respect to its support and thus to lower the sole so as to relieve the pressure of the presser rolls, the presser foot and the knife upon it. At substantially this same time the head 61 starts its rearward stroke, and the parts finally come to rest in position to receive another sole.

Although the invention has been set forth as embodied in a particular machine, it should be understood that the invention is not limited in the scope of its application to the particular machine which has been shown and described.

Having described the invention, what I claim as new and desire to secure by Letters Patent of the United States is:

1. A machine of the class described having, in combination, a table for supporting a blank, a cutter, a presser-foot in front of the cutter for determining the depth of the cut, means for causing relative movement between the table and the cutter and presser-foot both transversely and longitudinally of the bed to cause the cutter to enter, travel along in and emerge from the blank, and means for progressively engaging the blank alongside the groove as it is formed to hold the blank from movement with respect to the table.

2. A machine of the class described having, in combination, a table for supporting a blank, a cutter, a presser-foot in front of the cutter for determining the depth of the cut, means for causing relative movement between the table and the cutter and presser-foot both transversely and longitudinally of the bed to cause the cutter to enter, travel along in and emerge from the blank, and means for progressively engaging the blank on both sides of the groove as it is formed to hold the blank from movement with respect to the table.

3. A machine of the class described having, in combination, a table for supporting a blank, a cutter, a presser-foot in front of the cutter for determining the depth of the cut, means for causing relative movement between the table and the cutter and presser-foot both transversely and longitudinally of the bed to cause the cutter to enter, travel along in and emerge from the blank, and presser rolls for progressively engaging the blank on both sides of the groove during its formation to hold the blank from movement with respect to the table.

4. A machine of the class described having, in combination, a table for supporting a blank, a cutter, a presser-foot in front of the cutter for determining the depth of the cut, means for causing relative movement between the table and the cutter and presser-foot both transversely and longitudinally of the bed to cause the cutter to enter, travel along in and emerge from the blank, and presser rolls for progressively engaging the blank on both sides of the groove during its formation, and means for rotating the rolls with a peripheral speed equal to that at which the groove is being cut by the knife.

5. A machine of the class described having, in combination, a bed for supporting a blank, a grooving cutter, means for causing relative movement between the bed and cutter in a direction to cause the bed to be traversed by the cutter and for causing approach and separation of the bed and cutter, and a pair of spaced presser rolls located one on each side of the cutter for holding the blank from movement with respect to the bed.

6. A machine of the class described having, in combination, a table for supporting a blank, a grooving cutter, a head by which the cutter is carried, presser rolls also carried by the head, means for producing relative reciprocating movement between the head and the table, and means responsive to said relative reciprocating movement for rotating the presser rolls.

7. A machine of the class described having, in combination, a table for supporting a blank, a grooving cutter, a head by which the cutter is carried, presser rolls also carried by the head, means for producing relative reciprocating movement between the head and the table, a drum rigid with the presser rolls, and a cable having one end fastened to the bed and the other end extending around and fastened to the drum.

8. A machine of the class described having, in combination, a table for supporting a blank, a grooving cutter, a head by which the cutter is carried, presser rolls also carried by the head, means for producing relative reciprocating movement between the head and the table, a drum rigid with the presser rolls, and two cables each having one of its ends fastened to the drum and the other to the table.

9. A machine of the class described having, in combination, a cutter-head, a cutter carried thereby, a work-supporting table, means for reciprocating the cutter-head over the table, means for raising the table to cause the cutter to enter the work for holding it raised for an interval and for thereafter lowering it to cause the cutter to emerge from the work, a pair of presser rolls carried by the cutter-head, and means responsive to the reciprocation of the cutter-head for rotating the rolls.

10. A machine of the class described having, in combination, a cutter-head, a cutter carried thereby, a work table, a table-supporting bed, connections between a part of the table and the bed such that sliding movement of the table with respect to the bed raises the table, power means for so sliding the table and for reciprocating the cutter-head over the table, and means for adjusting the part of the table to which the bed is connected to vary the initial position of the table whereby the position into which it is raised by the power means is varied.

11. A machine of the class described having, in combination, a cutter-head, a cutter carried thereby, a work-supporting table comprising bars having slots inclined to the plane of the top of the table, said bars being adjustably fastened to the table, a table-supporting bed having rolls extending into said slots, means for adjusting the bars with respect to the table, and means for reciprocating the head over the table and for sliding the table with respect to the bed.

12. A machine of the class described having, in combination, a cutter-head, a cutter carried thereby, a work-supporting table, means for producing relative reciprocation between the table and the cutter-head lengthwise of the table, edge gages for the work normally spaced apart to permit a blank to be placed between them on the table, and means responsive to said reciprocating movement for causing the gages to close upon the blank.

13. A machine of the class described having, in combination, a cutter-head, a cutter carried thereby, a work-supporting table, means for reciprocating the cutter-head over the table, edge gages for the work, and means responsive to the reciprocation of said cutter-head for opening and closing said gages.

14. A machine of the class described having, in combination, a work table, a cutter-head, a cutter carried thereby, means for producing relative movement of reciprocation between the cutter-head and the table, spaced presser rolls rotatably mounted in the cutter-head, a presser-foot rotatably mounted between the rolls in front of the cutter, friction means connecting the presser-foot and the rolls whereby rotation of the rolls causes rotation of the presser-foot, and means for limiting the extent to which the presser-foot may be rotated.

15. A machine for cutting a groove in the shank portion of a sole for the reception of a shank stiffener, said machine having, in combination, a bed for supporting the sole, gages for engaging respectively the edge of the heel portion of the sole and the edge of the shank portion of the sole, a grooving cutter, a head upon which the cutter is fixed, a pair of spaced rolls located, one on each side of the cutter, and means for producing relative movement between the head and the bed to cause the cutter to produce the groove in the sole.

THOMAS H. SEELY.